United States Patent
Bentley et al.

(10) Patent No.: US 7,159,172 B1
(45) Date of Patent: Jan. 2, 2007

(54) DISPLAY FOR RAPID TEXT READING

(75) Inventors: Richard M. Bentley, Cambridge (GB); Kenton O'Hara, Bristol (GB)

(73) Assignee: Xerox Corporation, Stamford, CT (US)

( * ) Notice: Subject to any disclaimer, the term of this patent is extended or adjusted under 35 U.S.C. 154(b) by 762 days.

(21) Appl. No.: 09/707,923

(22) Filed: Nov. 8, 2000

(51) Int. Cl.
*G06F 15/00* (2006.01)
*G06F 3/00* (2006.01)
*G09G 5/00* (2006.01)

(52) U.S. Cl. ............ 715/526; 715/517; 715/518; 715/529; 715/790; 715/797; 715/838; 715/856; 345/156; 345/157

(58) Field of Classification Search ........ 715/525–526, 715/513, 517–518, 521, 790, 797, 838, 856, 715/858; 382/309, 173; 358/1.15; 434/169; 709/218; 345/156–157

See application file for complete search history.

(56) References Cited

U.S. PATENT DOCUMENTS

| | | | | |
|---|---|---|---|---|
| 5,960,448 | A * | 9/1999 | Reichek et al. | 715/526 |
| 6,023,714 | A * | 2/2000 | Hill et al. | 715/513 |
| 6,057,840 | A * | 5/2000 | Durrani et al. | 715/786 |
| 6,128,634 | A * | 10/2000 | Golovchinsky et al. | 715/526 |
| 6,130,968 | A * | 10/2000 | McIan et al. | 382/309 |
| 2002/0116420 | A1* | 8/2002 | Allam et al. | 707/526 |
| 2003/0184560 | A1* | 10/2003 | Pierce | 345/605 |
| 2003/0212759 | A1* | 11/2003 | Wu | 709/218 |

OTHER PUBLICATIONS

Lawton et al. "Streaming THumbnails Combining Low Resolution Navidation and RSVP Display" Published Apr. 1-6, 2000 pp. 159-160 by CHI 2000.*
Robertson et al. "The Document Lens" in Proceedings of the ACM Conference on User Interface Software and Technology (UIST '93), Atlanta, Georgia, Nov., ACM: 101-108, 1993.
Goldstein et al. "Enhancing the Reading Experience: Sonified On-Line Speed-Reading from a PDA Screen Using RSVP". In the fourth Swedish Symposium on Multimodal Communication. Oct. 26-27, 2000.
Schilit et al, "Context-Aware Computing Applications", in IEEE Workshop on Mobile Computing, Dec. 1994.
Visual, Text, Dynamic; EDU 170.06 (Last Updated Nov. 27, 2000) available on the Internet at: http://aaswebsv.aas.duke.edu/focus/it/visual/kinetictext/define.html.

* cited by examiner

*Primary Examiner*—William Bashore
*Assistant Examiner*—Chau Nguyen

(57) ABSTRACT

A display system uses so called rapid sequential visual presentation (RSVP) in which words are presented one after another in time, in a window for reading by a user. To provide context information, a thumbnail view of the document page or the section of text is also generated, and is used to indicate the location in the section of text of the word currently displayed in the RSVP window. In one example, an indicator is generated within the thumbnail view to show the position, and the indicator is moved automatically as the RSVP sequence advances. In another example, the thumbnail view is positioned in a background display pane behind the RSVP window, and the thumbnail view is moved relative to the RSVP window to indicate the current position in the text.

25 Claims, 3 Drawing Sheets

DISPLAY FOR RAPID TEXT READING

BACKGROUND OF THE INVENTION

1. Field of the Invention

This invention relates to a display for the rapid reading of text. In particular, the invention relates to a so-called Rapid Sequential Visual Presentation (RSVP) type display.

2. Description of Related Art

Referring to FIG. 1, RSVP is a known display technique in which single words 10 of a document text are presented in their sequential order, one at a time, at a certain rate, at a fixed location 12 on a display 14. This has been demonstrated to provide a significant increase in reading speed, by removing the need for the reader to engage in saccadic activity (i.e. the distinct leaps made by the eye between fixations). Therefore, the reading speed is increased by avoiding the normal delay of eye movement.

This technique also uses very little screen space, and has been suggested as a display technique for small portable displays.

However, such a technique does not provide the reader with any contextual information which is normally visible when reading a page or section of text.

For example, when reading normally from a piece of paper or from a screen image of a whole document, the reader can see where he or she is within the page of the document. This contextual information can be useful in helping the reader to get a sense of the text structure which may be important for understanding a document. It also provides the reader with important navigational cues within the text which can support searching, or re-reading, or judgment about how much of the text has been read relative to how much needs to be read.

Even if the reader is not conscious of viewing a page, or section of text as a whole, such contextual information is normally available to the eye subconsciously. The lack of this information with the conventional RSVP technique illustrated in FIG. 1 means that the reading experience is different or un-natural for the reader, because the usual visual spatial information from a page or section of text is not available to the eye.

SUMMARY OF THE INVENTION

The invention has arisen out of an appreciation of the above problem that the eye is not presented (consciously or subconsciously) with any context information with conventional RSVP. It would be desirable to provide an RSVP display which can provide the speed-reading advantages of RSVP but also provide the eye with context-based information.

Broadly speaking, one aspect of the invention is to provide a display consisting of:

(a) an RSVP type region in which words (or short phrases) are presented, sequentially in turn; and (b) a thumbnail view of a page or section of the text from which the words in the RSVP region originate, (c) wherein the thumbnail view is such as to indicate at least an approximate location of the RSVP text within the thumbnail view.

The term "thumbnail view" is used herein generally to mean a display in which the text is smaller than that in the RSVP region. The scale of thumbnail view may be significantly smaller than the scale in the RSVP region. In one form, the scale of the thumbnail view may be such that the text is not, in fact, legible in the thumbnail view, the location of text being indicated by dots, lines, or other marks or shading which roughly approximate word pattern in the page or section of text.

The thumbnail view preferably shows one or more boundaries of the text section or page, to give the reader an indication of the position of the words he is reading. In a particularly preferred form, the thumbnail view is a low-resolution image of a complete document page.

In one form, the thumbnail view is a stationary view, and a movable cursor or indicator within the thumbnail view indicates the approximate position of the RSVP text. The cursor or indicator moves automatically within the thumbnail view as the text is presented sequentially in the RSVP region of the display.

In another form, the thumbnail view is presented as a background to the RSVP region, and moves behind or "under" the RSVP region. The position of the thumbnail view relative to the RSVP region indicates the approximate location of the current RSVP text. The RSVP region therefore acts as a magnified window within the thumbnail view. However, since the RSVP region should remain stationary, the thumbnail view moves behind the RSVP region as text is sequentially displayed in the RSVP region.

The invention can therefore enable the speed-reading advantages of RSVP to be realized while providing the reader consciously or subconsciously with additional context information about the location of the text being read. This can be used by the reader as a context or navigation aid. It can also provide a more natural subconscious reading experience to the eye.

BRIEF DESCRIPTION OF THE DRAWINGS

Embodiments of the invention are now described by way of example only, with reference to the accompanying drawings, in which.

DETAILED DESCRIPTION

Figure 2:
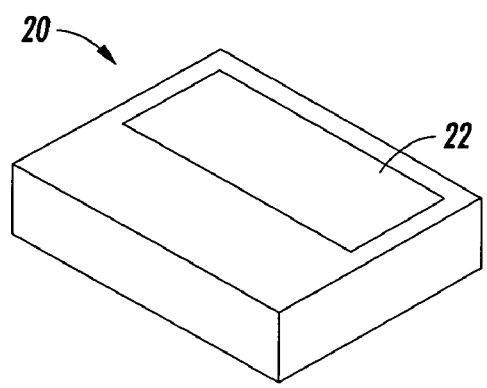
FIG. 2 is a schematic perspective view of a display device according to the invention.
Figure 3:
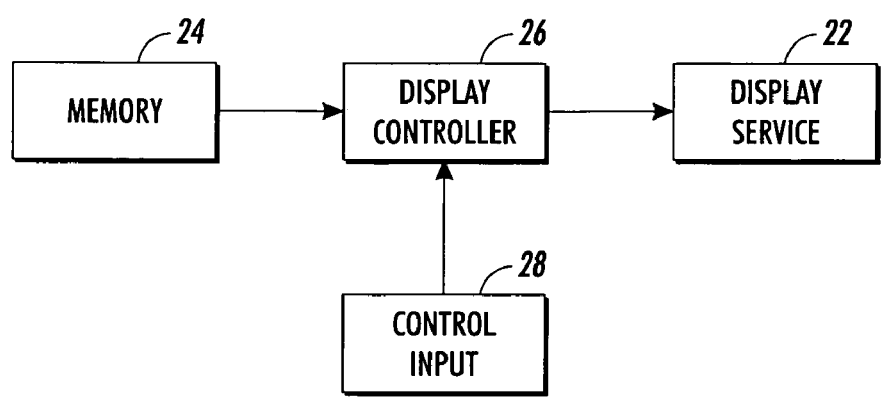
FIG. 3 is a schematic block diagram of the display device of FIG. 2.

Referring to FIGS. 2 and 3, an RSVP display apparatus 20 is illustrated having a display device 22 mounted therein. The RSVP display apparatus may be portable, and may consist, for example, of a portable document reader, an electronic "book", a portable computer, or other device. The display device 22 typically consists of an LCD device; as such devices provide low power consumption for port able apparatus. However, the display apparatus 20 is not necessarily portable, and any suitable display device 22 may be used as desired. For example, the display apparatus may be a conventional computer VDU (Video Display Unit).

The apparatus also comprises a memory 24 for storing data representing text to be viewed, and a display controller 26 for generating an image to be displayed and for controlling the display device 22 to generate the image. The text information stored within the memory 24 may, for example be in the form of image data directly representing an image to be viewed, or it may be in the form of text data for processing by the display controller 26 to generate an image.

Figure 1:
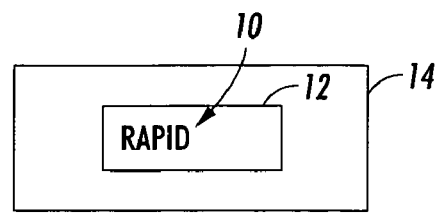
FIG. 1 is a schematic illustration of a conventional RSVP display.

The apparatus also includes an input device 28 for enabling a user to input control information for controlling the apparatus 20, and in particular the display controller 26. The input device is not shown explicitly in FIG. 1, but may, for example, comprise one or more of a touch sensitive screen, one or more buttons or keys, or a pointing device. The input device may be used to control, for example, the reading rate (i.e. the rate at which the words at presented in turn in an RSVP display), start and stop controls for starting and stopping the RSVP presentation, and navigation controls for enabling the user to locate text desired to be read.

The display controller 26 generates an image which consists of a first RSVP region in which words are presented sequentially in turn, at a controlled rate, for reading by the user. The display controller 26 also generates a thumbnail view showing a page or section of the text from which the RSVP text is being extracted. The following two examples are non-limiting examples of display schemes which enable the user to obtain contextual information about the document, and about the location of the RSVP text within the document.

Figure 4A:
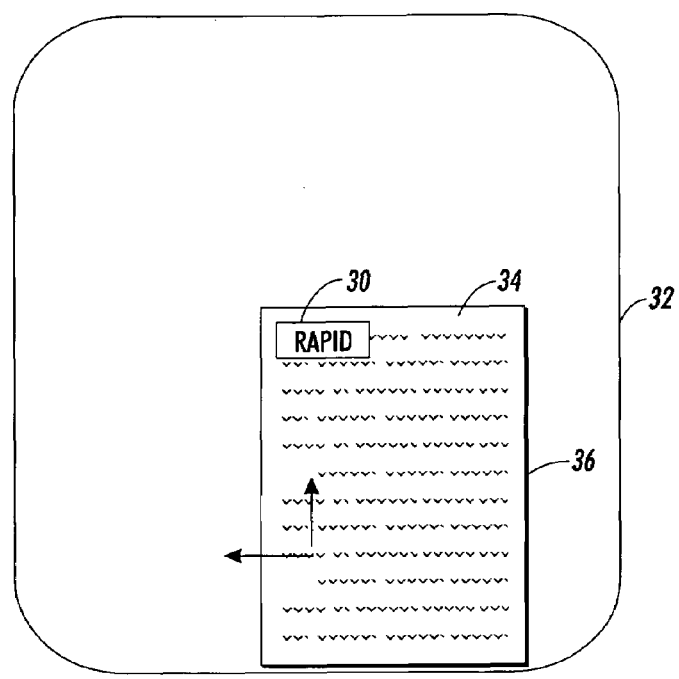
FIGS. 4(*a*) and 4(*b*) are schematic diagrams illustrating a first example of display.
Figure 4B:
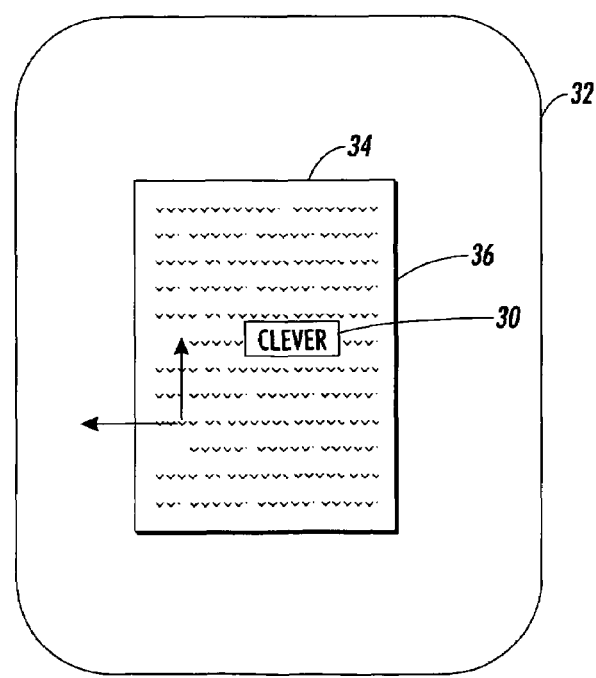

Referring to FIGS. 4(a) and 4(b), in a first example, an RSVP region 30 is generated in a stationary window located towards the center of a displayed image 32. A thumbnail view 34 of a document page is also generated and placed in the image "behind" or "under" the RSVP region 30. The RSVP region 30 is therefore effectively in a foreground pane of the display, and the thumbnail view 34 is in a background pane of the display (at least relative to said foreground pane in which the RSVP region is located).

The thumbnail view 34 moves relative to the RSVP region 30, such that relative position of the RSVP region 30 with respect to the thumbnail view 34 shows the approximate location of the text which is currently being displayed in the RSVP region 30. As the sequence of words in the RSVP 30 region advances at the set reading rate, the thumbnail view 34 moves in the background of the display, in a similar manner of movement to a movable document carriage of a mechanical typewriter. In effect, the RSVP region 30 acts as a magnified window within the thumbnail view 34; however, since the RSVP region 30 is stationary in the display, the thumbnail view 34 moves relative to the RSVP region to show the location of the text currently being displayed.

In FIG. 4(a), the RSVP region 30 is displaying the word "rapid" from the top left corner of the document page. In FIG. 4(b), the RSVP region 30 is displaying the word "clever" from the middle of the document page.

In the present embodiment, the thumbnail view 34 is a low resolution rendering of a complete document page. Depending on the resolution of the display device 22, the thumbnail view 34 will typically not itself be legible (or may be poorly legible).

As shown by the thickened line 36, the thumbnail view 34 is generated to have a shadow, or "depth" which is useful for indicating the number of subsequent pages in the document, or in a chapter of section of the document.

The example shown in FIGS. 4(a) and 4(b) can provide a highly intuitive display of the context of the text presented in the RSVP region 30. However, the thumbnail view 34 is limited to being no greater than about a quarter of the size of the whole image 32, to provide room for the thumbnail view 34 to be moved around the display relative to the RSVP region 30. This may, in some cases, place undesirable limitations on the display size, or the display quality, when an especially small display device 22 is desired to be used.

Figure 5:
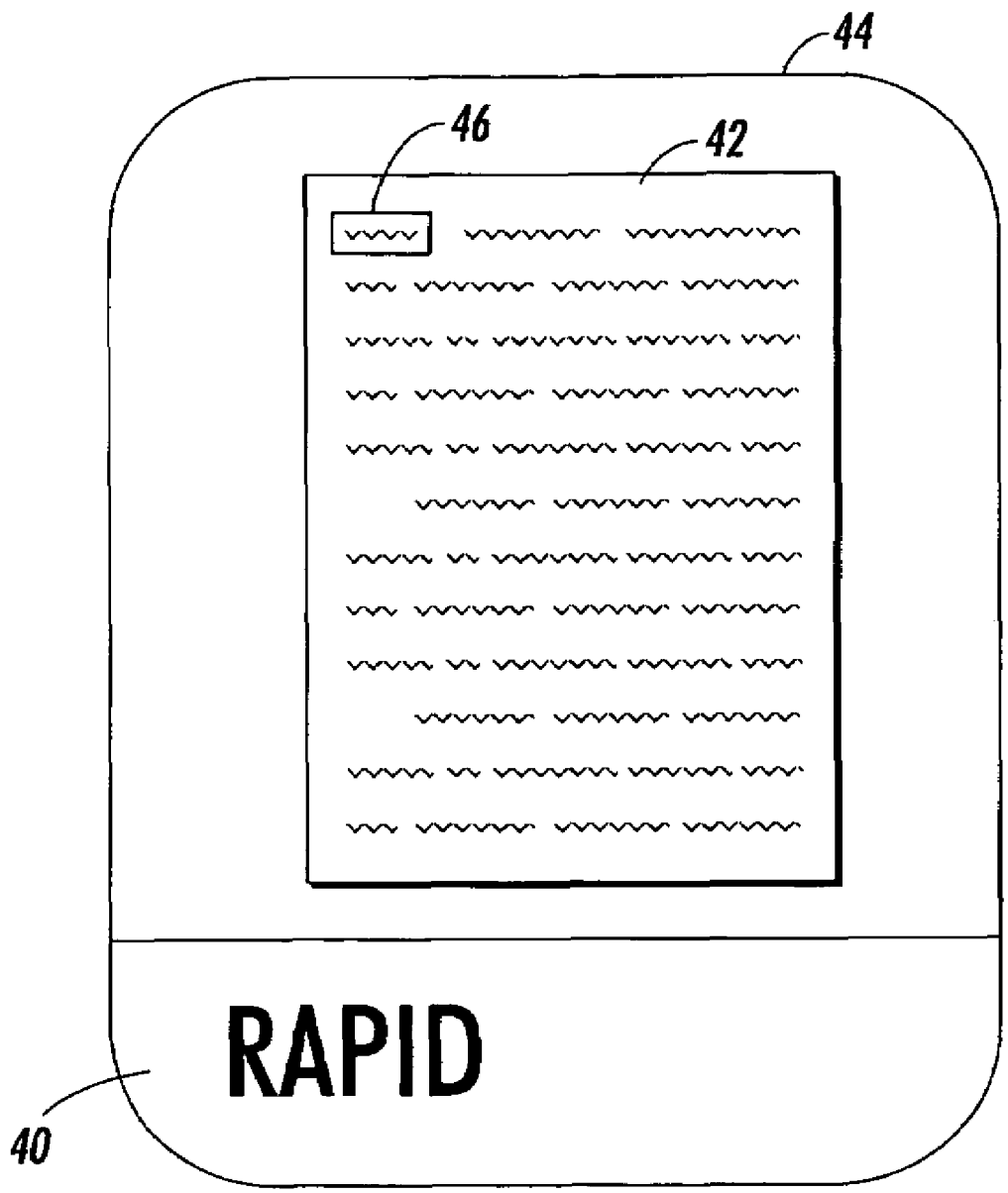
FIG. 5 is a schematic diagram illustrating a second alternative example of display.

In such cases, the alternative example shown in FIG. 5 may be advantageous. In this example, a stationary RSVP region 40 and a stationary thumbnail view 42 are displayed in separate windows or regions of a display 44. The display controller 26 also generates a movable cursor (or other indicator) 46 within the thumbnail view 42, at a position to indicate the location of the word currently displayed in the RSVP region 40. As the sequence of the words presented in the RSVP region 40 advances, the cursor 46 is moved to show the approximate location of each word, and hence provide the user with context information for the RSVP presentation.

In FIG. 5, the RSVP region 40 is shown below the thumbnail view 42. However, it will be appreciated that the RSVP region could be above, or to one side of, of separated further from, the thumbnail view 42, as desired.

In both of the above examples, a thumbnail view is provided in such a manner as to provide context information for the word sequence displayed in an RSVP display. However, the provision of the thumbnail can additionally be used to provide navigation control for the user. By clicking at, or moving a cursor to, a desired location in the thumbnail view, the display controller 26 can be controlled to start the RSVP presentation from that location in the document text. Also, for the first example illustrated in FIGS. 4(a) and 4(b), the user may be able to drag the document thumbnail 34 relative to the RSVP region 30, to control the start position for the RSVP presentation.

It will be appreciated that the foregoing description is merely illustrative of preferred embodiments of the invention, and that many modifications or equivalents will be apparent to one skilled in the art without departing from the scope or spirit of the invention.

The invention claimed is:

1. A display apparatus for displaying a sequential presentation of words from a section of text, comprising:
   a display device; and
   a display controller for controlling an image displayed by the display device;
   wherein the display controller controls the display device to generate a display image comprising:
   a first display region in which words from the section of text are presented sequentially one after another in time; and
   a second display region of which at least a portion is overlapped by the first display region, and in which there is presented a thumbnail view of the section of the text from which the words in the first display region are sequentially presented; and
   wherein the display controller in generating the display image controls movement of the thumbnail view relative to the first display region in the display image, as the words from the section of text are sequentially presented in the first display region, to indicate at least an approximate location within the thumbnail view of the word currently presented in the first display region by where that portion of the first display region overlaps the thumbnail view.

2. The display apparatus according to claim 1, wherein the display controller sequentially presents words from the section of text, in turn, in the first display region, at a controlled presentation rate.

3. The display apparatus according to claim 2, wherein the display controller generates the display image with the first display region maintained at a fixed position within the display image.

4. The display apparatus according to claim 1, wherein the display controller generates the thumbnail view to be larger than the first display region, the thumbnail view being located in a first display pane of the display image, and wherein the first display region is located in a second display pane of the display image in front of the first display pane, the second display pane overlapping the first display pane.

5. The display apparatus according to claim 4, wherein the first display pane is centered in the display image.

6. The display apparatus according to claim 5, wherein the first display pane is stationary in the display image.

7. The display apparatus according to claim 6, wherein a start word from the section of text is selected by moving the first pane relative to the second pane.

8. A display apparatus for displaying a sequence of words from a section of text, comprising:
   a display device; and
   a display controller for controlling an image displayed by the display device;
   wherein the display controller controls the display device to generate a display image comprising:
   a first display region in which words in the sequence of words are presented one after another in time; and
   a second display region of which a portion is overlapped by the first display region, and in which there is presented a thumbnail view of the section of the text from which the words in the first display region are sequentially presented;
   wherein the display controller moves the thumbnail view's position within the display image relative to the first display region as the words from the section of text are sequentially presented in the first display region, such that the relative position of the thumbnail view is indicative of the location in the section of text of the word currently displayed in the first display region by where that portion of the first display region overlaps the thumbnail view.

9. The display apparatus according to claim 8, wherein the display controller maintains the first display region at a fixed position within the display image.

10. The display apparatus according to claim 9, wherein the display controller generates marks in the thumbnail view that approximate word patterns in the section of the text.

11. The display apparatus according to claim 9, wherein the display controller generates a shadow on the thumbnail view to indicate a number of pages remain in a document after the page presented in the thumbnail view.

12. The display apparatus according to claim 8, wherein a start position in the sequence of words is selected by moving the thumbnail view relative to the first display region.

13. A method for operating a display apparatus to generate a display image for displaying a sequential presentation of words from a section of text in a display of the display apparatus, comprising:
   generating a first display region in the display image in which words from the section of text are presented sequentially one after another in time;
   generating a second display region in the display image of which at least a portion is overlapped by the first display region, and in which there is presented a thumbnail view of the section of text from which the words in the first display region are sequentially presented; and
   moving in the display image the thumbnail view relative to the first display region in the display image, as the words from the section of text are sequentially presented in the first display region, to indicate at least an approximate location within the thumbnail view of the word currently being displayed in the first display region by where that portion of the first display region overlaps the thumbnail view.

14. The method according to claim 13, further comprising generating the thumbnail view to be larger than the first display region, the thumbnail view being located in a first display pane, and the first display region being located in a second display pane in front of the first display pane, the second display pane overlapping the first display pane.

15. The method according to claim 14, wherein the first display pane is centered in the display image.

16. The method according to claim 15, wherein the first display pane is stationary in the display image.

17. The method according to claim 16, wherein a start word from the section of text is selected by moving the first pane relative to the second pane.

18. The method according to claim 13, wherein words from the section of text are sequentially presented, in turn, in the first display region, at a controlled presentation rate.

19. The method according to claim 18, wherein said moving maintains the first display region within the display image at a fixed position.

20. A method for operating a display apparatus to generate a display image for displaying a sequence of words from a section of text in a display of the display apparatus, comprising:
   generating a first display region in the display image in which words in the sequence of words are presented one after another in time;
   generating a second display region of which a portion is overlapped by the first display region, and in which there is presented a thumbnail view of the section of text from which the words in the first display region are sequentially presented; and
   moving the thumbnail view's position within the display image relative to the first display region as the words from the section of text are sequentially presented in the first display region, such that the relative position of the thumbnail view is indicative of the location in the section of text of the word currently displayed in the first display region by where that portion of the first display region overlaps the thumbnail view.

21. The method according to claim 20, wherein the sequence of words presented one after another in time in the first display region is advanced at a controlled presentation rate.

22. The method according to claim 20, wherein said controlling maintains the first display region within the display image at a fixed position.

23. The method according to claim 22, further comprising generating marks in the thumbnail view that approximate word patterns in the section of the text.

24. The method according to claim 22, further comprising generating a shadow on the thumbnail view to indicate a number of pages remain in a document after the page presented in the thumbnail view.

25. The method according to claim 20, wherein a start position in the sequence of words is selected by moving the thumbnail view relative to the first display region.

* * * * *